United States Patent
Yassa

(10) Patent No.: US 10,068,565 B2
(45) Date of Patent: Sep. 4, 2018

(54) METHOD AND APPARATUS FOR AN EXEMPLARY AUTOMATIC SPEECH RECOGNITION SYSTEM

(71) Applicant: Fathy Yassa, Soquel, CA (US)

(72) Inventor: Fathy Yassa, Soquel, CA (US)

( * ) Notice: Subject to any disclaimer, the term of this patent is extended or adjusted under 35 U.S.C. 154(b) by 0 days.

(21) Appl. No.: 14/563,511

(22) Filed: Dec. 8, 2014

(65) Prior Publication Data

US 2015/0161983 A1   Jun. 11, 2015

Related U.S. Application Data

(60) Provisional application No. 61/913,188, filed on Dec. 6, 2013.

(51) Int. Cl.
| | | |
|---|---|---|
| *G10L 15/00* | (2013.01) | |
| *G10L 15/065* | (2013.01) | |
| *G10L 15/183* | (2013.01) | |
| *G10L 13/02* | (2013.01) | |
| *G10L 13/033* | (2013.01) | |
| *G10L 15/06* | (2013.01) | |
| *G10L 13/00* | (2006.01) | |
| *G10L 21/013* | (2013.01) | |

(52) U.S. Cl.
CPC ............ *G10L 15/065* (2013.01); *G10L 13/00* (2013.01); *G10L 13/02* (2013.01); *G10L 13/033* (2013.01); *G10L 15/063* (2013.01); *G10L 15/183* (2013.01); *G10L 2021/0135* (2013.01)

(58) Field of Classification Search
CPC ...... G10L 15/183; G10L 13/02; G10L 13/033
USPC .................. 704/257, 270, E15.001, E13.001
See application file for complete search history.

(56) References Cited

U.S. PATENT DOCUMENTS

| | | | | |
|---|---|---|---|---|
| 5,842,165 A | * | 11/1998 | Raman .................. | G10L 15/065 704/255 |
| 6,622,121 B1 | * | 9/2003 | Crepy .................... | G10L 15/01 704/243 |
| 7,133,827 B1 | * | 11/2006 | Gillick .................. | G10L 15/063 704/243 |
| 2006/0085187 A1 | * | 4/2006 | Barquilla ................ | G10L 13/08 704/243 |
| 2006/0206332 A1 | * | 9/2006 | Paek ...................... | G10L 15/063 704/257 |
| 2008/0082333 A1 | * | 4/2008 | Nurminen ............... | G10L 21/00 704/250 |
| 2009/0006096 A1 | * | 1/2009 | Li .......................... | G10L 13/033 704/260 |
| 2009/0037179 A1 | * | 2/2009 | Liu ........................ | G10L 13/033 704/260 |
| 2009/0070102 A1 | * | 3/2009 | Maegawa ............. | G10L 15/183 704/9 |

\* cited by examiner

*Primary Examiner* — Forrest F Tzeng
(74) *Attorney, Agent, or Firm* — Sughrue Mion, PLLC

(57) ABSTRACT

An exemplary computer system configured to train an ASR using the output from a TTS engine.

1 Claim, 2 Drawing Sheets

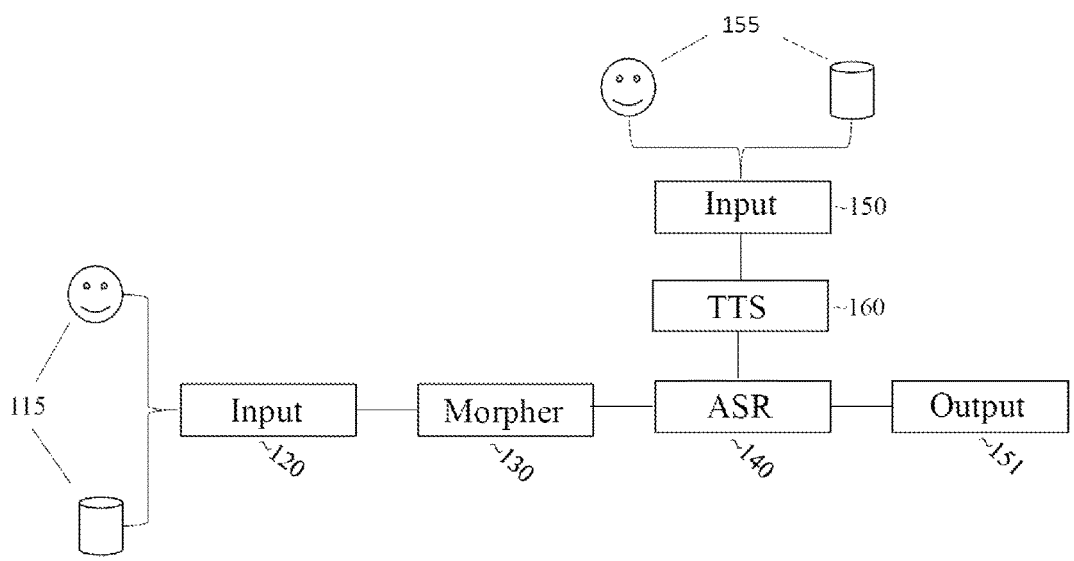

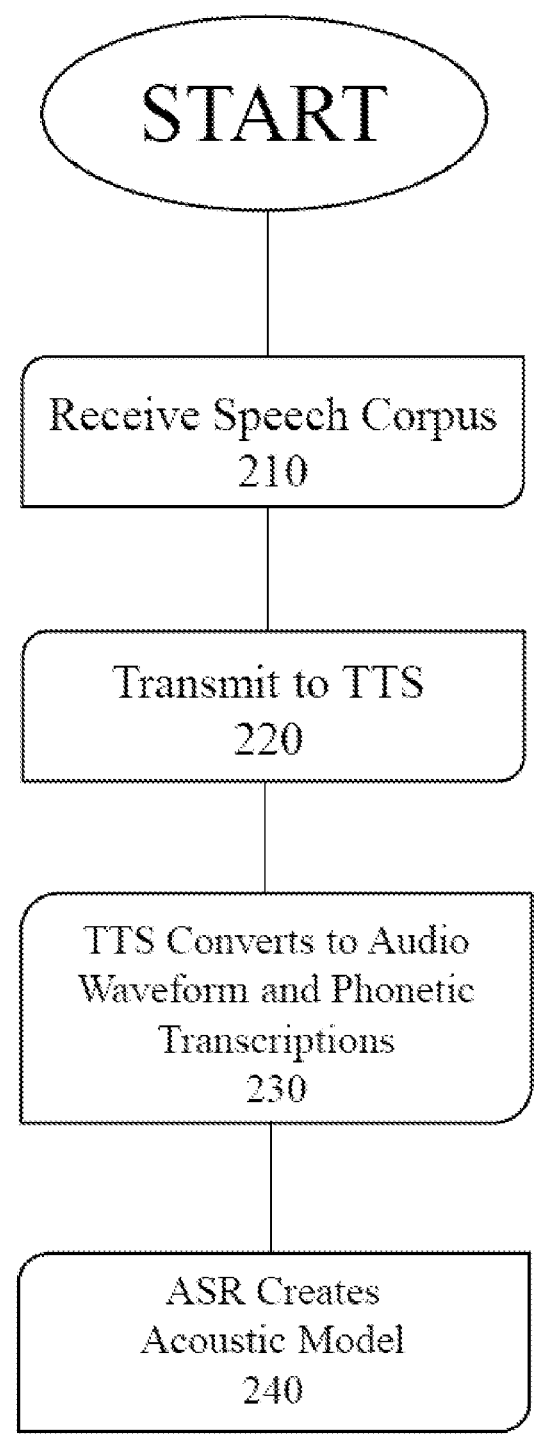

METHOD AND APPARATUS FOR AN EXEMPLARY AUTOMATIC SPEECH RECOGNITION SYSTEM

CLAIM OF PRIORITY

This patent application claims priority from U.S. Provisional Patent Application No. 61/913,188, filed on Dec. 6, 2013, in the U.S. Patent and Trademark Office, the disclosure of which is incorporated herein by reference in its entirety.

BACKGROUND

1. Field

Embodiments herein relate to a method and apparatus for exemplary speech recognition.

2. Description of Related Art

Typically speech recognition is accomplished through the use of an Automatic Speech Recognition (ASR) engine, which operates by obtaining a small audio segment ("input speech") and finding the closest matches in the audio database.

SUMMARY

Embodiments of the present application relate to speech recognition using a specially optimized ASR that has been trained using a text to speech ("TTS") engine and where the input speech is morphed so that it equates to the audio output of the TTS engine

DESCRIPTION OF THE DRAWINGS

FIG. 1 illustrates a system level diagram of the computer system

FIG. 2 illustrates a flow diagram one of the several embodiments of the TTS training the ASR

DETAILED DESCRIPTION OF THE EMBODIMENTS

FIG. 1 illustrates a block diagram of a system for enhancing the accuracy of speech recognition according to an exemplary embodiment.

The speech recognition system in FIG. 1 may be implemented as a computer system 110; a computer comprising several modules, i.e. computer components embodied as either software modules, hardware modules, or a combination of software and hardware modules, whether separate or integrated, working together to form an exemplary computer system. The computer components may be implemented as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Input 120 is a module configured to receive human speech from an audio source 115, and output the input speech to Morpher 130. The audio source 115 may be live person speaking into a microphone, recorded speech, synthesized speech, etc.

Morpher 130 is a module configured to receive human speech from Input 120, morph said input speech, and in particular the pitch, duration, and prosody of the speech units, into the same pitch, duration and prosody on which ASR 140 was trained, and route said morphed speech to an ASR 140. Module 130 may be software modules, hardware modules, or a combination of software and hardware modules, whether separate or integrated, working together to perform said function ASR 140 may be software modules, hardware modules, or a combination of software and hardware modules, whether separate or integrated, working together to perform automatic speech recognition. ASR 140 is configured to receive the morphed input speech, decode the speech into the best estimate of the phrase by first converting the morphed input speech signal into a sequence of vectors which are measured throughout the duration of the speech signal. Then, using a syntactic decoder it generates one or more valid sequences of representations, assign a confidence score to each potential representation, select the potential representation with the highest confidence score, and output said representation as well as the confidence score for said selected representation.

To optimize ASR 140, ASR 140 uses "speaker-dependent speech recognition" where an individual speaker reads sections of text into the SR system, i.e. trains the ASR on a speech corpus. These systems analyze the person's specific voice and use it to fine-tune the recognition of that person's speech, resulting in more accurate transcription.

Output 151 is a module configured to output the text generated by ASR 140.

Input 150 is a module configured to receive text in the form of phonetic transcripts and prosody information from Text Source 155, and transmit said text to TTS 160. The Text Source 155 is a speech corpus, i.e., a database of speech audio files and phonetic transcriptions, which may be any of a plurality of inputs such as a file on a local mass storage device, a file on a remote mass storage device, a stream from a local area or wide area, a live speaker, etc.

Computer System 110 utilizes TTS 160 to train ASR 140 to optimize its speech recognition. TTS 160 is a text-to-speech engine configured to receive a speech corpus and synthesize human speech. TTS 160 may be software modules, hardware modules, or a combination of software and hardware modules, whether separate or integrated, working together to perform automatic speech recognition. TTS 160 is composed of two parts: a front-end and a back-end. The front-end has two major tasks. First, it converts raw text containing symbols like numbers and abbreviations into the equivalent of written-out words. This process is often called text normalization, pre-processing, or tokenization. The front-end then assigns phonetic transcriptions to each word, and divides and marks the text into prosodic units, like phrases, clauses, and sentences. The process of assigning phonetic transcriptions to words is called text-to-phoneme or grapheme-to-phoneme conversion. Phonetic transcriptions and prosody information together make up the symbolic linguistic representation that is output by the front-end. The back-end—often referred to as the synthesizer—then converts the symbolic linguistic representation into sound. In certain systems, this part includes the computation of the target prosody (pitch contour, phoneme durations) which is then imposed on the output speech.

Referring to FIG. 2, FIG. 2 illustrates a flow diagram of how Computer System 110 trains ASR 140 to optimally recognize input speech. At step 210 Input 150 receives a speech corpus from Text Source 155 and transmits said speech corpus to TTS 160 at step 220. At step 230 TTS 160 converts said speech corpus into an audio waveform and transmits said audio waveform and the phonetic transcripts to ASR 140. ASR 140 receives the audio waveform and phonetic transcriptions from TTS 160 and creates an acoustic model by taking the audio waveforms of speech and their transcriptions (taken from a speech corpus), and 'compiling' them into a statistical representations of the sounds that make up each word (through a process called 'training'). A unit of sound may be a either a phoneme, a diphone, or a triphone. This acoustic model is used by ASR 140 to recognize input speech.

Thus, ASR 140's acoustic model is a near perfect match for TTS 160.

I claim:

1. An automatic speech recognition (ASR) system comprising:
   - a text input module configured to receive a speech corpus comprising prosody information of at least one speech file of a first speaker and phonetic transcriptions corresponding to the at least one speech file, wherein the prosody information and the phonetic transcription are generated or gathered specifically for the at least one speech file of the first speaker, and wherein the prosody information comprises pitch contours and time durations for all phonemes, diphones, or triphones based on the phonetic transcriptions;
   - a text-to-speech (TTS) engine configured to receive the specific prosody information and the phonetic transcriptions from the first speech input module, and synthesize, based on a generic TTS acoustic model, the at least one speech file of the first speaker into an audio waveform having a first prosody based on the prosody information, and output the audio waveform and the phonetic transcriptions;
   - an ASR engine configured to receive the audio waveform and the phonetic transcriptions output by the TTS engine, and create an ASR acoustic model through training on the audio waveform and the phonetic transcriptions output by the TTS engine by compiling the audio waveform and the phonetic transcriptions output by the TTS engine into statistical representations of phonetic units of the audio waveform based on the phonetic transcriptions, wherein the phonetic units comprise phonemes, diphones, or triphones;
   - a speech input module configured to receive an input speech of a second speaker;
   - a speech morphing module comprising an ASR module configured to morph the human speech of the second speaker having a second prosody, preserving word boundary information and types of breaks between words and changing pitch contours and time durations for all phonemes, diphones, or triphones, into morphed human speech having a prosody that is the same as the first prosody of the audio waveform of the at least one speech audio file of the first speaker output by the TTS engine, wherein the first and the second prosody comprise corresponding pitch contours and time durations for all phonemes, diphones, or triphones;
   - wherein the ASR engine receives the morphed human speech morphed by the speech morphing module, recognizes the morphed human speech based on the trained ASR acoustic model, and outputs text corresponding to the recognized morphed human speech.

* * * * *